(12) United States Patent
Sedlar

(10) Patent No.: US 8,955,849 B2
(45) Date of Patent: Feb. 17, 2015

(54) RADIAL SHAFT SEAL AND ASSEMBLY THEREWITH

(71) Applicant: Federal Mogul Corporation, Southfield, MI (US)

(72) Inventor: Brent R. Sedlar, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/909,874

(22) Filed: Jun. 4, 2013

(65) Prior Publication Data

US 2014/0042709 A1 Feb. 13, 2014

Related U.S. Application Data

(60) Provisional application No. 61/655,226, filed on Jun. 4, 2012.

(51) Int. Cl.
*F16J 15/32* (2006.01)

(52) U.S. Cl.
CPC .......... *F16J 15/3232* (2013.01); *F16J 15/3224* (2013.01)
USPC ........... 277/563; 277/560; 277/561; 277/562; 277/568

(58) Field of Classification Search
USPC ......... 277/549, 551, 559, 560, 561, 562, 563, 277/568
See application file for complete search history.

(56) References Cited

U.S. PATENT DOCUMENTS

| | | | |
|---|---|---|---|
| 2,823,051 A * | 2/1958 | Johnson et al. ............ | 277/356 |
| 3,356,376 A | 12/1967 | Bradfute et al. | |
| 3,534,969 A | 10/1970 | Weinand | |
| 3,822,890 A | 7/1974 | Bourgeois | |
| 4,033,593 A | 7/1977 | Molnar et al. | |
| 4,243,232 A * | 1/1981 | Repella ....................... | 277/568 |
| 4,258,927 A | 3/1981 | Cather, Jr. | |
| 4,556,225 A | 12/1985 | Drygalski et al. | |
| 4,616,836 A | 10/1986 | Drygalski et al. | |
| 5,024,449 A * | 6/1991 | Otto ............................. | 277/353 |
| 5,645,283 A | 7/1997 | Drucktenhengst et al. | |
| 6,029,980 A | 2/2000 | Downes | |
| 6,053,501 A | 4/2000 | Innis, Jr. et al. | |
| 6,401,843 B1 * | 6/2002 | Besson et al. .............. | 175/359 |
| 7,086,201 B2 | 8/2006 | Struyven et al. | |
| 7,464,939 B2 | 12/2008 | Matsui | |
| 7,467,796 B2 | 12/2008 | Tones et al. | |
| 7,900,933 B2 | 3/2011 | Tones et al. | |
| 2005/0073110 A1 | 4/2005 | Armour et al. | |
| 2010/0187768 A1 | 7/2010 | Sedlar et al. | |
| 2010/0187769 A1 | 7/2010 | Sedlar et al. | |

FOREIGN PATENT DOCUMENTS

EP   0744567   1/1996

* cited by examiner

*Primary Examiner* — Gilbert Lee
(74) *Attorney, Agent, or Firm* — Robert L. Stearns; Dickinson Wright, PLLC

(57) ABSTRACT

A radial shaft seal and assembly are provided. The seal has an annular mounting portion and a seal body bonded thereto. The seal body extends to a seal lip extending between an oil-side end and a free air-side end. An annular bridge extends between the seal lip and a central portion of the seal body in radially overlying relation to the seal lip. A primary dust lip extends from the air-side end and has an annular rib configured for sealed abutment with a running surface of a shaft. The annular rib has at least one vent. An auxiliary dust lip extends from the central portion of the seal body to a free end configured for sealed abutment with the shaft. The free end of the auxiliary dust lip has at least one vent spaced circumferentially from the at least one vent in the annular rib.

10 Claims, 3 Drawing Sheets

RADIAL SHAFT SEAL AND ASSEMBLY THEREWITH

CROSS-REFERENCE TO RELATED APPLICATION

This application claims the benefit of U.S. Provisional Application Ser. No. 61/655,226, filed Jun. 4, 2012, which is incorporated herein by reference in its entirety.

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil side" of the seal and an "air side." These designations pertain to the orientation of the seal when installed, with the oil side facing the interior of the housing in communication with the oil, whereas the air side faces outwardly in exposed relation to the air.

There are at least two different ways in which a radial shaft oil seal can be installed. An "air side installation" is one in which the seal is first installed into the bore of the housing and the shaft (or its wear sleeve) is thereafter installed from the air side axially into the seal assembly (in the direction inward of the housing) to form the annular seal against the seal. An "oil side installation" is the other where the housing and shaft are already present and the seal assembly is slid axially into the housing and simultaneously onto the shaft (or its wear sleeve), such that the shaft enters the seal assembly from the oil side of the seal to form the annular seal. Otherwise, "oil-side" installation requires the seal assembly to be installed into the housing, also referred to as carrier, and then the housing, with seal installed therein, is assembled to an engine over the "all ready in place" shaft such that the shaft passes through the seal from the oil side to form the annular seal.

During installation, regardless of the type of installation method used, the seal must be able to withstand the axial load resulting during installation without causing a seal lip of the seal to reverse fold or otherwise become displaced to a position where the seal lip is ineffective in the fully installed condition. The axial load imparted on the seal lip is largely due to the friction between the seal body/seal lip and an outer surface of the shaft as the two are moved axially relative to one another during installation. Accordingly, it is desirable to minimize the friction generated during installation of the shaft through the seal, however, a delicate balance needs to be maintained in order to attain the desired seal between the seal lip and the shaft. Further, it is important to prevent positive or negative pressures on the oil-side of the seal lip from moving the seal lip out of sealing engagement with the sealing surface, while at the same time, preventing contamination on the air-side from reaching the oil-side of the seal.

SUMMARY OF THE INVENTION

In general terms, this invention provides a radial shaft seal that facilitates maintaining a proper seal when exposed to positive or negative pressure on an oil side of the seal assembly when installed and during use. The seal further prevents the ingress of contamination from an air side to the oil side of the seal.

In accordance with one presently preferred aspect of the invention, a radial shaft seal is configured for receipt in a housing and about a shaft to sealingly isolate an air-side of the shaft seal from an oil-side of the shaft seal. The seal includes an annular mounting portion and a seal body bonded to the mounting portion. The seal material forms a seal lip having an annular sealing surface extending between an oil-side end and a free air-side end, wherein the sealing surface is configured to extend axially relative to the shaft. An annular bridge is connected to the oil-side end of the seal lip by a hinge and to a central portion of the seal body by another hinge. The bridge extends in radially overlying relation to the seal lip. A primary dust lip extends directly from the air-side end. The primary dust lip has an annular rib configured for sealed abutment with a running surface of the shaft. The annular rib has at least one vent. An auxiliary dust lip extends from the central portion of the seal body to a free end configured for sealed abutment with the running surface of the shaft. The free end of the auxiliary dust lip has at least one vent spaced circumferentially from the at least one vent in the annular rib, such that no vents are aligned axially with one another.

In accordance with another aspect of the invention, a radial shaft seal assembly is provided. The radial shaft seal assembly includes a shaft extending along a central axis and providing a running surface. The assembly further includes a radial shaft seal configured for receipt in a housing and about the shaft to sealingly isolate an air-side of the radial shaft seal from an oil-side of the radial shaft seal. The radial shaft seal includes an annular mounting portion and a seal body bonded to the mounting portion. The seal material forms a seal lip having an annular sealing surface extending between an oil-side end and a free air-side end, wherein the sealing surface is configured to extend axially relative to the shaft. An annular bridge is connected to the oil-side end of the seal lip by a hinge and to a central portion of the seal body by another hinge. The bridge extends in radially overlying relation to the seal lip. A primary dust lip extends directly from the air-side end. The primary dust lip has an annular rib configured for sealed abutment with the running surface of the shaft. The annular rib has at least one vent. An auxiliary dust lip extends from the central portion of the seal body to a free end configured for sealed abutment with the running surface of the shaft. The free end of the auxiliary dust lip has at least one vent spaced circumferentially from the at least one vent in the annular rib, such that no vents are aligned axially with one another.

With the respective vents being spaced circumferentially from one another and outer of axial alignment with one another, positive and negative pressures are prevented from being established on the oil-side of the seal lip, while at the same time, contamination is inhibited from ingress from the air-side to the oil-side of the seal lip.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
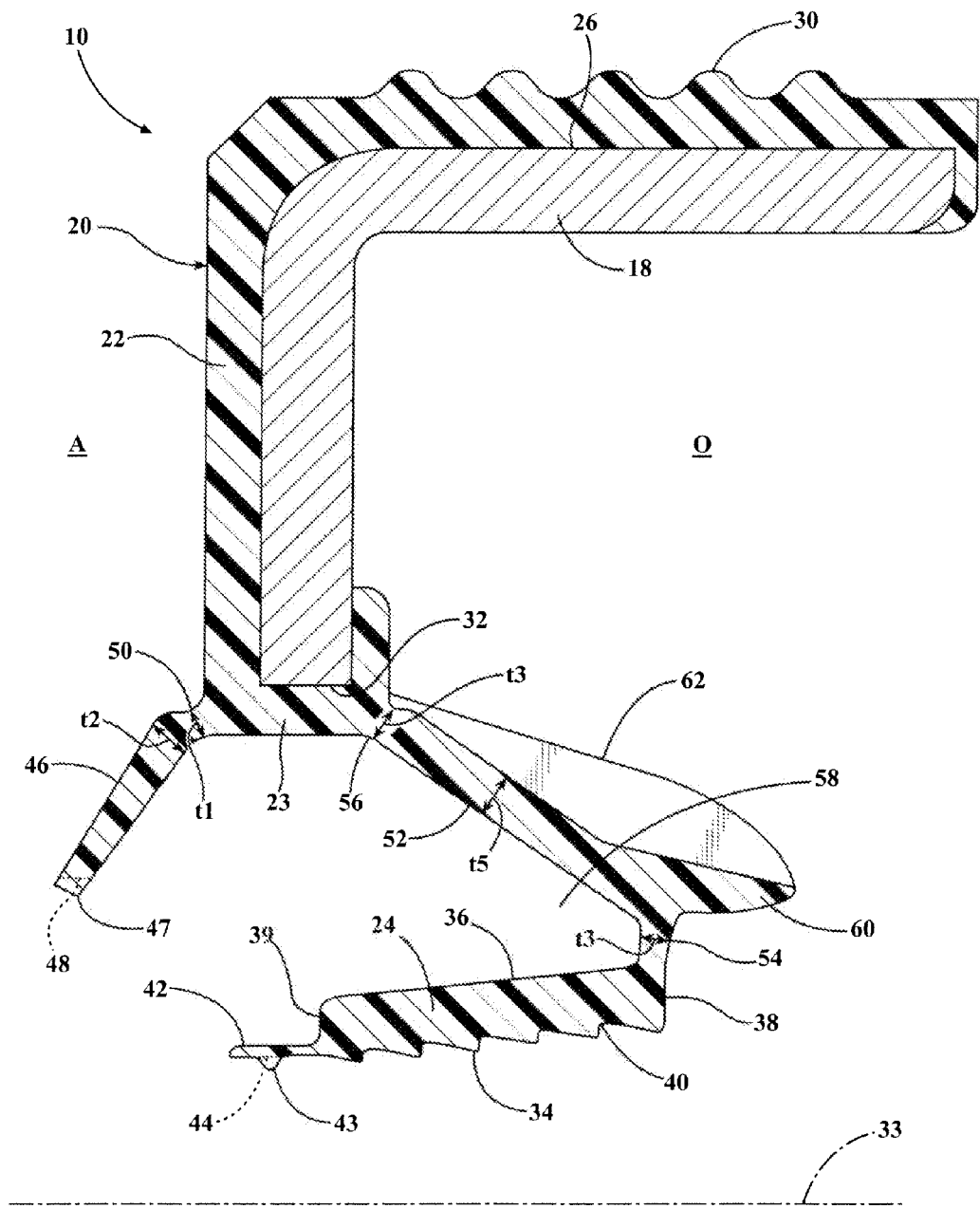
FIG. 1 is a cross-sectional view of a radial shaft seal constructed according to one aspect of the invention.
Figure 2:
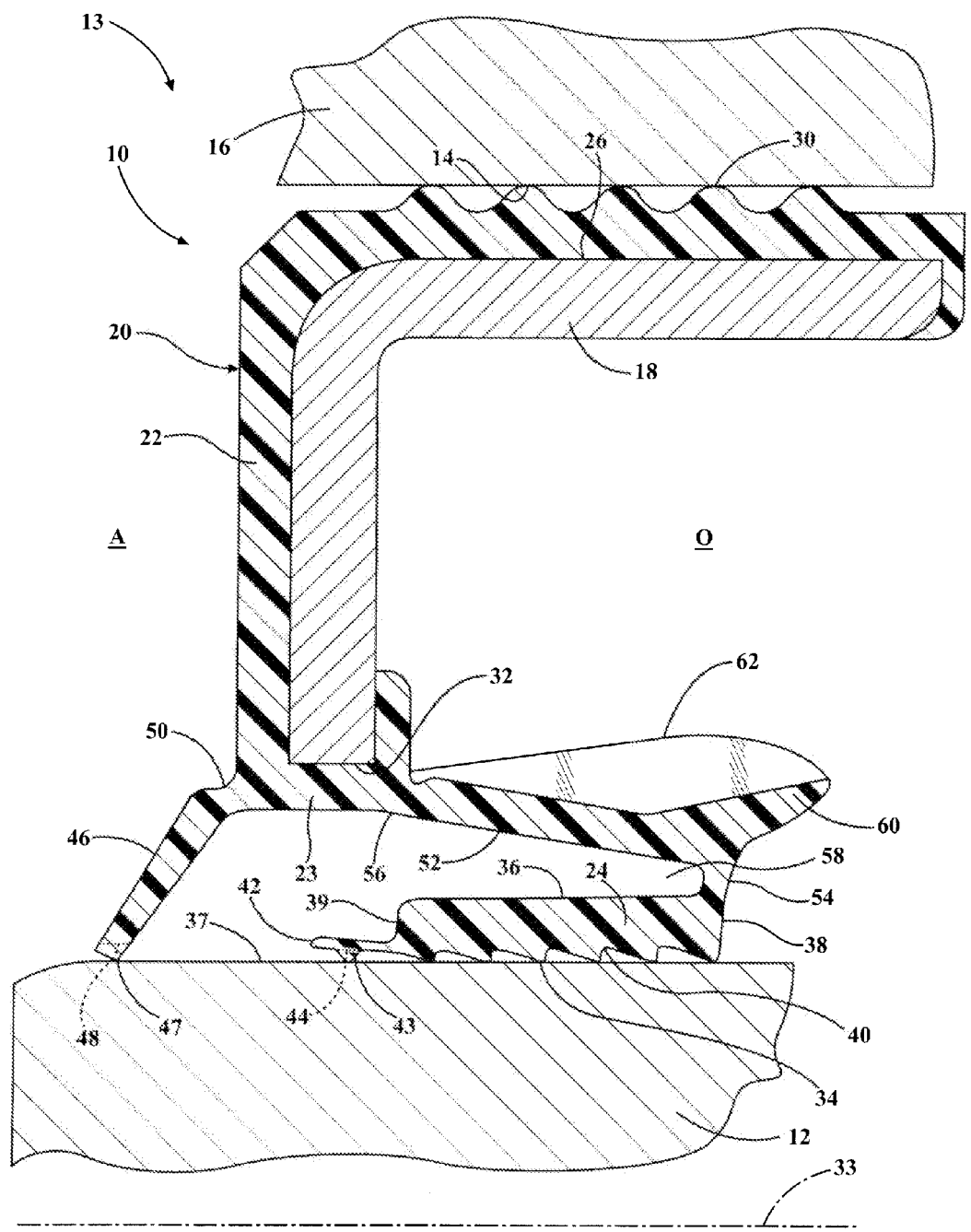
FIG. 2 is a cross-sectional view of the seal of FIG. 1 shown disposed in a housing and on a shaft to form a radial shaft seal assembly in accordance with the invention.

Referring in more detail to the drawings, FIGS. 1-2 illustrate a radial shaft seal, referred to hereafter as seal 10, constructed in accordance with one aspect of the invention, wherein the seal is suitable for use in a crankcase application, by way of example and without limitation. As shown in FIG. 2, the seal 10 is configured to form a radial shaft seal assembly 13 for sealing about a rotatable shaft 12 extending through a bore 14 of a housing 16, such as a crankcase, in which the seal 10 is installed. Otherwise, the seal 10 can be installed into a carrier housing, whereupon the carrier housing and seal 10 can be attached to the engine. With reference to FIGS. 1 and 2, the seal 10 has an oil-side O and an axially opposite air-side A, in relation to the orientation of the seal 10 when installed, with the oil-side O facing to the interior of the crankcase 16 and the air-side A facing away from the oil side O toward the outside environment. The seal 10 includes a mounting portion, such as a case, also referred to as core or collar 18, preferably provided as a metal annulus or ring structure, with an elastomeric seal material 20 attached thereto. The seal material 20 forms at least part of an elastomeric seal body 22 with an axially extending seal lip 24 that exhibits low dynamic frictional contact with the shaft 12 during use, thereby resulting in a low torque between the shaft 12 and the seal lip 24, such as between about 0.07-0.35 N*m (Newton meters), as newly installed, during and upon use. Accordingly, as a result of the minimal frictional losses exhibited by the seal 10, the losses in efficiency of the engine are kept to a minimum.

The annular metal collar 18 may be ring-shaped, or may take on any number of configurations, such as C-shaped, S-shaped, or, L-shaped as illustrated, by way of example, depending upon the requirements of a particular application, as is know in the art. The metal collar 18 is shown covered at least in part with the elastomeric seal material 20 on a radially outwardly facing surface 26 which may be contoured with undulations 30 to provide a snug and fluid tight installation in the bore 14 of the crankcase 16. The elastomeric seal material 20 of the seal body 22 extends around and radially inwardly from an inner surface 32 of the metal core 18 to provide a central portion 23 of the seal body 22 radially inward from the metal core 18. The core 18 and seal body 22 are relatively rigid, yet the seal material 20 is sufficiently resilient to form the seal lip 24.

The seal lip 24, when in the relaxed, uninstalled state (FIG. 1), extends in a slightly inclined orientation, such as between about 1-10 degrees from a horizontal central axis 33 of the seal 10, and has an annular, radially inwardly facing sealing surface 34 and an opposite, radially outwardly facing backing surface 36 extending between an oil-side end 38 and a free air-side end 39. The sealing surface 34, while in its free state, has a maximum diameter at the oil-side end 38 that is less than an outer diameter of a running surface 37 of the shaft 12, and thus, the entire sealing surface 34 is assured of being brought into sealing engagement with the running surface 37 upon completing installation of the seal 10 about the shaft 12.

Figure 3:
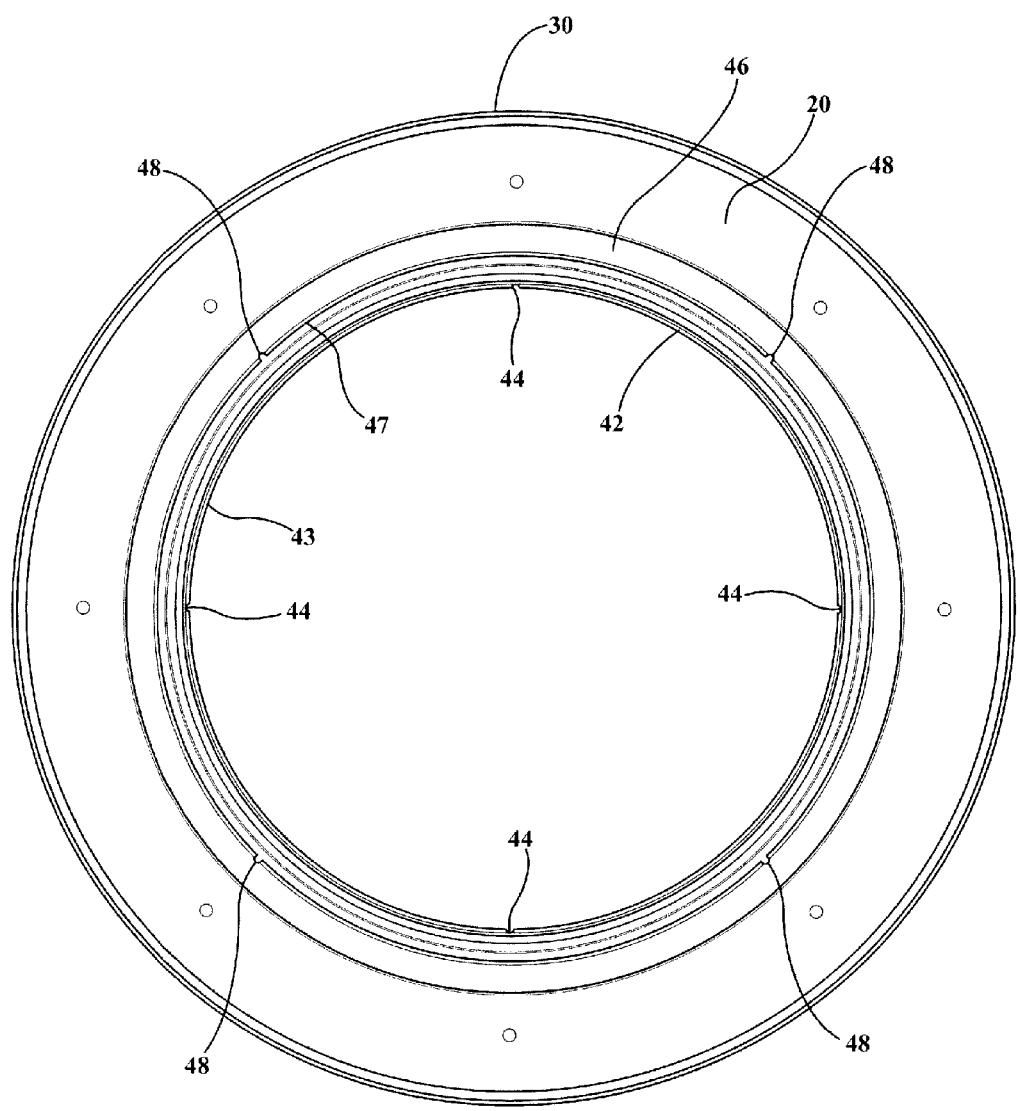
FIG. 3 is a front view looking from an air-side toward an oil-side showing the relative locations of vents in a primary auxiliary seal lip and a secondary auxiliary seal lip of the seal of FIGS. 1 and 2.

The sealing surface 34 can be configured having hydrodynamic features 40 in the form of ribs or a thread, that act to pump oil back to the oil-side O of the seal 10 during rotation of the shaft 12. Further, a primary dust exclusion lip, referred to hereafter as primary dust lip 42, extends directly from the air-side end 39 of the seal lip 24 toward the air-side A. The primary dust lip 42 inhibits the ingress of contamination from the air-side A to the oil-side O of the seal assembly 10, and further, facilitates maintaining the lubricant on the oil-side O of the assembly 10. The primary dust lip 42 has an annular rib 43 configured for sealed abutment with the running surface 37, wherein at least one, and shown in FIG. 3 as a plurality of rib vents 44, referred to hereafter as vents 44, are formed in the rib 43. The vents 44 are depicted as being spaced equidistantly from one another circumferentially about the rib 43 of the primary dust lip 42, through other configurations are contemplated herein. The vents 44 are formed as radially outwardly extending notches that extend radially outwardly into the rib 43 to allow passage of air, however, are minimal in size to inhibit the passage of contamination.

The seal 10 further includes an annular auxiliary dust exclusion lip, referred to hereafter as auxiliary dust lip 46. The auxiliary dust lip 46 extends radially inwardly directly from the central portion 23 of the seal body 22, from adjacent the inner surface 32 of the metal core 18, toward the air-side A sufficiently to establish sealing contact between a free end 47 of the auxiliary dust lip 46 against the running surface 37 of the shaft 12. Accordingly, the auxiliary dust lip 46 diverges away from the oil-side O and generally away from the seal lip 24, thereby assuring that the auxiliary dust lip 46 will not interfere with the primary dust lip 42 upon installation of the seal 10 on the shaft 12. Further, an oil-side assembly is made easy given the auxiliary dust lip 46 extends toward the air-side A. As with the primary dust lip 42, the auxiliary dust lip 46 has at least one, and represented in FIG. 3 as a plurality of lip vents 48, referred to hereafter as vents 48, extending radially into the free end 47. The vents 48 are depicted as being spaced equidistantly from one another circumferentially about the auxiliary dust lip 46, though other configurations are contemplated herein. As shown, each of the respective vents 44, 48 are offset circumferentially from one another such that no two vents 44, 48 are axially aligned with one another. As such, the vents 44, 48, while acting together to prevent a vacuum or positive pressure from forming under the main seal lip 24 and on the oil side O, also act together to prevent the ingress of contamination from the air side A to the oil side O by avoiding the formation of a straight path for the ingress of contamination.

To further enhance the operational performance of the seal 10, the auxiliary dust lip 46 has an annular hinge 50 adjacent the central portion 23. The hinge 50 is formed by a reduced thickness in the seal material 20. Accordingly, the hinge 50 has a first thickness t1 and the auxiliary dust lip 46 has a second thickness t2 immediately adjacent the hinge 50 radially inwardly from the hinge 50, wherein t1 is less than t2 (t1<t2). As such, the operational running torque of the seal 10 is minimized.

An annular bridge 52 operably connects the seal lip 24 to the seal body 22. The annular bridge 52 is connected to the oil-side end 38 of the seal lip 24 by a first hinge 54 and to the central portion 23 by a second hinge 56. The bridge 52 extends from the first hinge 54 to the second hinge 56 in radially overlying relation to the seal lip 24, and thus, provides an annular pocket 58 facing the air-side A of the seal assembly 10. The first and second hinges 54, 56 are constructed having respective reduced thickness t3, t4 relative to a thickness t5 of the bridge 52. Accordingly, the relative thicknesses are such that t3 and t4 are less than t5 (t3 and t4<t5).

The seal 10 is further illustrated, by way of example and without limitation, as having an annular projection 60 that extends generally from above the first hinge 54 axially away from the seal lip 24 and the bridge 52 toward the oil-side O of the seal 10. The projection 60 is configured to aid in the oil-side installation to prevent the seal lip 24 and bridge 52 from unfolding during installation. Further, the projection 60 is configured to remain out of contact with the shaft running surface 37 upon installation and during use.

A plurality of stiffening ribs, referred to hereafter as ribs 62, can be molded as one piece of material with the seal body 22. The ribs 62 facilitate assembly and maintain the sealing surface 34 of the seal lip 24 in proper sealing relation with the running surface 37 of the shaft 12 during and upon assembly. The ribs 62 extend axially along the bridge 52, and are shown here as extending along an upper or radially outwardly facing surface of the projection 60 and along the full length of the bridge 52 and terminating at the central portion 23 of the seal body 22. The ribs 62 can be provided in any suitable number sufficient to prevent reverse folding of the bridge 52 and the main seal lip 24 during assembly. The ribs 62 are preferably spaced equidistant from one another about the circumference of the seal body 22. The height of the ribs 62 is such that they remain spaced from the seal body 22 upon the seal 10 being installed on the shaft 12.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air-side of the shaft seal from an oil-side of the shaft seal, comprising:
    an annular mounting portion;
    a seal body bonded to said mounting portion;
    a seal lip having an annular sealing surface extending between an oil-side end and a free air-side end, said sealing surface being configured to extend axially along the shaft;
    an annular bridge connected to said oil-side end of said seal lip by a hinge and to a central portion of said seal body by another hinge, said bridge extending in radially overlying relation to said seal lip;
    a primary dust lip extending from said air-side end, said primary dust lip having an annular rib configured for sealed abutment with a running surface of the shaft, said annular rib having at least one rib vent; and
    an auxiliary dust lip extending from said central portion of said seal body to a free end configured for sealed abutment with the running surface of the shaft, said free end of said auxiliary dust lip having at least one lip vent spaced circumferentially from said at least one rib vent in said annular rib.

2. The radial shaft seal of claim 1 wherein said primary dust lip has a plurality of said rib vents and said auxiliary dust lip as a plurality of said lip vents.

3. The radial shaft seal of claim 2 wherein said rib vents are spaced equidistantly from one another and said lip vents are spaced equidistantly from one another.

4. The radial shaft seal of claim 1 wherein said auxiliary dust lip diverges away from said seal lip toward the air-side.

5. The radial shaft seal of claim 1 wherein said auxiliary dust lip has an annular hinge having a first thickness and a portion immediately adjacent said hinge radially inwardly from said hinge having a second thickness, said first thickness being less than said second thickness.

6. A radial shaft seal assembly, comprising:
    a shaft extending along a central axis and providing a running surface;
    a radial shaft seal configured for receipt in a housing and about said shaft to sealingly isolate an air side of the radial shaft seal from an oil side of the radial shaft seal, comprising:
    an annular mounting portion;
    a seal body bonded to said mounting portion,
    a seal lip having an annular sealing surface extending between an oil-side end and a free air-side end, said sealing surface being configured to extend axially along said running surface of said shaft;
    an annular bridge connected to said oil side end of said seal lip and to a central portion of said seal body, said bridge extending in radially overlying relation to said seal lip;
    a primary dust lip extending from said air side end of said seal lip, said primary dust lip having an annular rib configured for sealed abutment with a running surface of the shaft, said annular rib having at least one rib vent; and
    an auxiliary dust lip extending from said central portion of said seal body to a free end configured for sealed abutment with said running surface of said shaft, said free end of said auxiliary dust lip having at least one lip vent spaced circumferentially from said at least one rib vent.

7. The radial shaft seal assembly of claim 6 wherein said primary dust lip has a plurality of said rib vents and said auxiliary dust lip as a plurality of said lip vents.

8. The radial shaft seal assembly of claim 7 wherein said rib vents are spaced equidistantly from one another and said lip vents are spaced equidistantly from one another.

9. The radial shaft seal assembly of claim 6 wherein said auxiliary dust lip diverges away from said seal lip toward the air-side.

10. The radial shaft seal assembly of claim 6 wherein said auxiliary dust lip has an annular hinge having a first thickness and a portion immediately adjacent said hinge radially inwardly from said hinge having a second thickness, said first thickness being less than said second thickness.

* * * * *